United States Patent [19]

Cassarly et al.

[11] Patent Number: 5,107,357
[45] Date of Patent: Apr. 21, 1992

[54] LOW INSERTION LOSS OPTICAL BEAM STEERER

[75] Inventors: William J. Cassarly, King of Prussia; John C. Ehlert, Erdenheim, both of Pa.

[73] Assignee: General Electric Company, King of Prussia, Pa.

[21] Appl. No.: 643,396

[22] Filed: Jan. 18, 1991

[51] Int. Cl.$^5$ .............................................. G02F 1/13
[52] U.S. Cl. ...................................... 359/94; 359/36; 359/70; 359/95
[58] Field of Search .................... 350/162.17, 162.19, 350/162.22, 162.24, 334, 338, 348, 347 V, 347 E

[56] References Cited

U.S. PATENT DOCUMENTS

| | | | |
|---|---|---|---|
| 3,843,231 | 10/1974 | Borel et al. | 350/162.24 |
| 4,251,137 | 2/1981 | Knop et al. | 350/162.19 |
| 4,484,072 | 11/1984 | Matsumura | 350/162.22 |
| 4,751,509 | 7/1988 | Kubota et al. | 350/348 |
| 4,850,681 | 7/1989 | Yamanobe et al. | 350/347 V |
| 4,850,682 | 7/1989 | Gerritsen | 350/347 V |
| 4,915,463 | 4/1990 | Barbee, Jr. | 350/162.22 |
| 4,937,539 | 6/1990 | Grinberg et al. | 330/4.3 |
| 4,964,701 | 10/1990 | Dorschner et al. | 350/336 |
| 5,013,141 | 5/1991 | Sakata | 350/347 V |

FOREIGN PATENT DOCUMENTS

| | | | |
|---|---|---|---|
| 60-194428 | 10/1985 | Japan | 350/334 |
| 60-239710 | 11/1985 | Japan | 350/334 |
| 60-241025 | 11/1985 | Japan | 350/334 |
| 60-244935 | 12/1985 | Japan | 350/334 |
| 62-8129 | 1/1987 | Japan | 350/334 |

OTHER PUBLICATIONS

"Efficient Array Illuminator Using Binary-Optics Phase Plates at Fractional-Talbot Planes" by Leger et al., Published at pp. 288-290 of Optics Letters, vol. 15, No. 5, Mar. 1, 1990.
"Making An Array Illuminator Based On The Talbot Effect", by Lohmann et al., Published at p. 4337 of the Oct. 10, 1990 Issue, vol. 29, No. 29 of Applied Optics.
"Optical Beam Steering Using A Multichannel Lithium Tantalate Crystal" by Meyer, Published at p. 613 et seq. Mar. 1972, vol. 11, No. 3 of Applied Optics.
"Continuous Wide Angle Beam Steering Using Translation of Binary Microlens Arrays and a Liquid Crystal Phased Array" by Flood et al., was Published SPIE 1211, Jan. 1990.
"Phase Control of Coherent Diode Laser Arrays Using Liquid Crystals", by Cassarly et al., was Published SPIE 1043, Jan. 1989.
"Self-Imaging Cavities for Phase Locking of Laser Diode Arrays and Fill Factor Enhancement", by D'Amato et al., Published in the Friday Afternoon, Apr. 28, 1989 CLEO Proceedings.

Primary Examiner—Rolf Hille
Assistant Examiner—Minhloan Tran
Attorney, Agent, or Firm—William H. Meise; Stephen A. Young; Clement A. Berard

[57] ABSTRACT

An optical beam scanner or spoiler includes an array of electrically controlled liquid crystal phase shifters. Each element of the phase shifter includes an active region where proper phase shift occurs, and also includes another region, generally near the edges of the element, in which light transmission does not occur or in which improper modulation results. The inefficient regions reduce the light transmission or modulation efficiency of the array. An aperture illuminator includes a Talbot plane phase plate (also known as a Fresnel image phase plate) interposed between the incident light beam and the liquid crystal array. The phase plate includes a transparent substrate with a binary pattern of regions of relatively higher and lower index of refraction in a repeating pattern with a period P. In a particular embodiment of the invention, the regions are physically raised and lowered portions of a surface. The phase plate generates an interference pattern of energy maxima and minima, and is located so the maxima fall on the active regions of the liquid crystal array, and the minima on the inactive portions. A second phase plate similar to the first (or a second pass through the first phase plate in a reflective system) reduces the magnitude of far-field grating lobes created by the first phase plate.

10 Claims, 5 Drawing Sheets

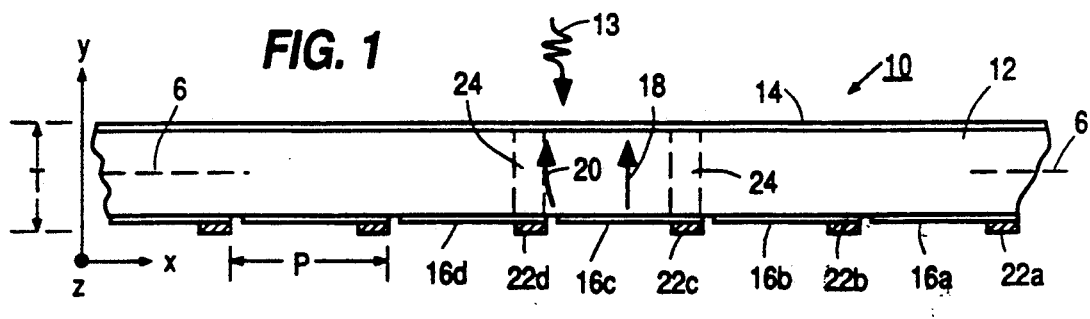
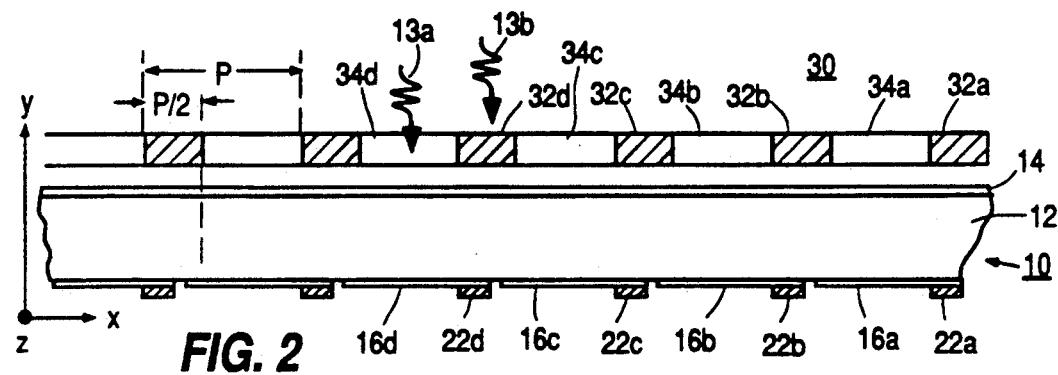
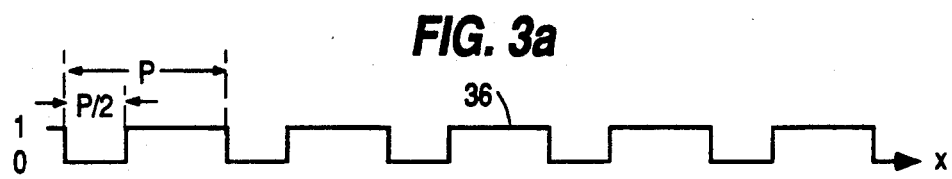
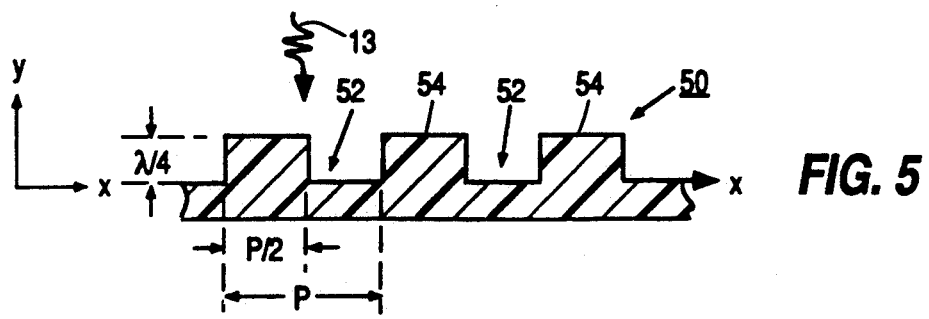

LOW INSERTION LOSS OPTICAL BEAM STEERER

This invention relates to the steering of beams of electromagnetic radiation by arrays of controllable phase shifters.

BACKGROUND OF THE INVENTION

Agile control of beams of electromagnetic radiation is important for many purposes. Directed energy weapons must direct their energy toward targets which may be moving. Also, systems for target detection by ranging and locating, such as radar or laser, directed communications systems involving moving vehicles, and controlled laser welding systems may all require that beams of electromagnetic radiation be directed in an agile and controlled manner. Instead of changing the direction, agile control may require that a beam be spoiled, or broadened, so as to be more likely to intercept a target.

Those skilled in the art of antennas and radiation know that such systems are reciprocal, and operate in the same manner in both a beam transmission and beam reception mode. Thus, descriptions of the operation of such systems may be couched in terms of either transmission or reception, with the other mode of operation being understood therefrom.

A scanning arrangement for control of an optical beam is described in U.S. Pat. No. 4,937,539, issued June 26, 1990 in the name of Grinberg et al. The Grinberg et al. arrangement includes at least one array of controlled liquid crystal phase shifters to provide beam deflection in a first direction. Control in a second direction is provided by cascading a second, mutually orthogonal phase shifter with the first phase shifter. The liquid crystal phase shifters include active portions through which light may pass and be controlled, and also includes regions with electrical conductors which are necessary to convey electrical control signals to various portions of the liquid crystal. These electrical conductors reflect the light which impinges thereon, with the result that portions of the liquid crystal phase shifter lying under the electrical conductor do not receive light, and are in effect inactive for the purpose of phase control of light passing through the phase shifting element. When a pair of cascaded arrays are used for the purpose of achieving scanning in two planes, the loss attributable to the inactive portions is also cascaded. In addition, the light reflected by the electrical conductors may create radiation patterns established by the array defined by the electrical conductors. This reflected energy may, in a reflective system, result in fixed grating lobes or sidelobes. For purposes of explanation, no distinction is made herein between the terms "energy" and "power", which later is formally the time rate of energy.

Mechanical beam scanning systems such as rotating mirrors or reflectors are effective for some purposes, as for example for surveillance such as radar volume surveillance. When targets must be tracked, however, mechanical systems may suffer from speed problems due to inertia, and reliability may be less than that desired.

U.S. Pat. No. 5,015,080, filed Mar. 26, 1990 in the name of Cassarly et al. describes a beam steerer in which an array of liquid crystal phase shifters is associated with at least one mechanically translated microlens array. Translation of a microlens array relative to an incident beam of energy as described therein may cause an unwanted second beam of energy due to overfilling of the aperture of a microlens of the array. The microlens array may be costly to fabricate, since it requires manufacture of lens elements in which the individual features may be smaller than a wavelength. The focusing effect of the lens may concentrate the beam of energy in a small portion of the liquid crystal. If substantial energy is involved, the concentration may result in control of the liquid crystal molecules by the electromagnetic field as well as by the control voltage, thereby creating a nonlinearity. In addition, thermal effects at the focus may cause deterioration of the liquid crystal. When a pair of liquid crystal phase shifters are to be cascaded, only one can be at the focus, with the result that the phase front in one liquid crystal phase shifter will be flat, while the phase front in the other will be curved. This in turn may complicate the control, introduce pointing inaccuracy, or cause beam spreading.

For small steer angle, high accuracy applications, an improved beam scanning and control arrangement may be desired.

SUMMARY OF THE INVENTION

An array of controllable phase shifters includes active areas and inactive areas. The active areas respond to incident electromagnetic radiation for effective phase shift thereof, while the inactive areas do not so respond. The phase shift may be controlled to provide beam scanning or spoiling. In a particular embodiment of the invention, the phase shifters are liquid crystal phase shifters which act on light, and the inactive regions are regions where electrical conductors block light, or edge regions in which the electrical field configuration may not be optimum. In accordance with an aspect of the invention, a Fresnel image phase plate or Talbot plane phase plate is interposed in the radiation path. The phase plate in one embodiment includes a transparent substrate with a surface formed, as by etching, with a binary or other stepped pattern of raised and lowered portions in a repeating pattern with period P. The phase plate may be transmissive or reflective, and produces periodic region-to-region phase shifts in a propagating electromagnetic wavefront. When illuminated, the stepped pattern results in an interference pattern with a period related to P, which at certain distances forms reinforced and canceled energy regions (maxima and minima). The phase plate is registered with the phase shifter array and is spaced therefrom at a distance selected to cause the reinforced portions of the energy to coincide with the active portions of the phase shifter array, and substantially canceled portions to coincide with the inactive portions of the phase shifter array. In a particular embodiment of the invention, an aperture illuminator in the form of a first transmissive phase plate is arranged on one side of a transmissive phase shifter array. This improves the transmission efficiency of the phase shifter array, but gives rise to grating lobes. According to another aspect of the invention, a second transmissive phase plate similar to the first is located on the other side of the phase shifter for beam filling to reduce grating lobes.

DESCRIPTION OF THE DRAWING

FIG. 1 is a simplified cross-sectional view of a transmissive liquid crystal phase shifter array which is adapted for beam steering, illustrating regions in which light transmission or phase-shifting performance is impaired;

FIG. 2 illustrates in cross-sectional view a liquid crystal array similar to that of FIG. 1, cascaded with an aperture array;

FIG. 3a is an idealized plot of illumination amplitude or irradiance versus position immediately adjacent the exit side of the aperture array of FIG. 2, and FIG. 3b is a corresponding phase plot;

FIGS. 4c-4f are examples for 25% fill factor.

FIG. 5 is a cross-sectional view of a transparent Fresnel image phase plate or a Talbot plane phase plate which may be used with a phase shifter array in accordance with the invention, and FIG. 4g is a plot of irradiance versus position, with an indication of phase, created by phase plate of FIG. 5;

DESCRIPTION OF THE INVENTION

Figure 4A:
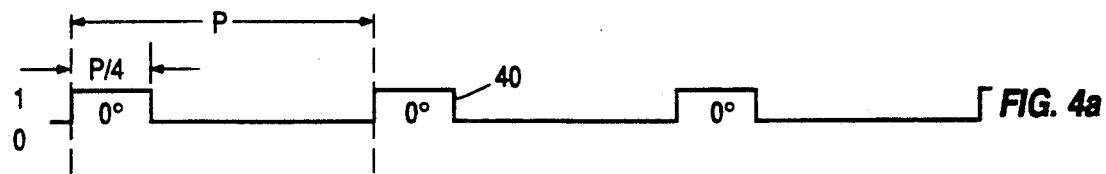
FIGS. 4a through 4f are idealized plots of irradiance versus position, with an indication of relative phase, at various distances from the exit side of the aperture array such as that of FIG. 2.

FIG. 1 is a cross-sectional view of a thin, planar liquid crystal array 10 extending parallel to the x-z plane, which may be used for phase-shifting a beam of light, represented by a photon symbol 13, for thereby scanning the light beam. The thickness of liquid crystal array 10 is denoted by T, and dash-line 6 represents the edge of a line of symmetry passing through array 10 parallel to the x-z plane. As illustrated in FIG. 1, liquid crystal array 10 includes a chamber 12 filled with nematic or other liquid crystal material (not separately designated), in contact with a transparent common electrical conductor 14 on an upper side. The lower side includes a plurality of separated, periodically spaced, transparent electrical conductors 16a, 16b, 16c, 16d ... which are individually adapted to receive electrical control voltages from a source (not illustrated in FIG. 1). Indium-tin oxide (ITO) is often used for such transparent conductors. The separate control exerted by each transparent conductor 16 divides the liquid crystal material in chamber 12 into separate elements or segments (not separately designated) of liquid crystal array 10.

The spacing period of conductors 16 of FIG. 1 is designated P. Electrical conductors 16a, 6b ... are thin, elongated rectangular strips, the width dimension of which extends in the x direction in FIG. 1. The longest dimension of each of conductors 16a, 16b ... is orthogonal to the plane of the FIGURE, parallel to the z axis.

The mutual separation of electrical conductors 16a, 16b ... allows control or bias voltages to be applied independently to any one of, or combination of, conductors 16. When a control voltage is applied between one of elongated, transparent conductors 16, for example conductor 16c, and common electrical conductor 14, the voltage is applied across that portion of the liquid crystal material within chamber 12 which lies within the influence of the electrical field between conductor 16c and common conductor 14. As is well known to those skilled in the art, the electric field lines originating or terminating near the center of a conductor 16 are straight and orthogonal to the plane of the conductor, as illustrated by arrow 18 associated with conductor 16c of FIG. 1, while the electrical field lines terminating near the edge of the conductor may be curved, and extend in directions which are not orthogonal to the x-z plane, as suggested by arrow 20 of FIG. 1. The liquid crystal molecules in the liquid crystal chamber align themselves in response to the direction of the electric field, and therefore the alignment of the molecules differs as between the center and edges of each segment of the liquid crystal array. Predictable performance of a liquid crystal phase shifter is obtained where the field lines are straight and normal to the plane of the conductor, and is difficult to predict where the field lines curve and extend in other directions.

Transparent conductors such as 14 and 16 of FIG. 1 tend to have significant resistivity. In order to reduce energization voltage differences attributable to current flow through elongated conductors 16, and to allow changes in control voltage to propagate quickly through a cell of the liquid crystal array, an elongated conductor with lower resistivity may be associated with each transparent conductor 16. In FIG. 1, relatively low resistivity conductors 22a, 22b, 22c ..., seen in edge view, are affixed near an edge of transparent conductors 16a, 16b, 16c ..., respectively, in electrical contact therewith. Electrical connection between each transparent conductor 16 and the control circuit (not illustrated) is made by way of its associated conductor 22. However, the lower resistivity of electrical conductors 22 requires use of a material, such as molybdenum, which is opaque. Because of the opacity of conductors 22, normally incident light cannot pass through liquid crystal array 10 in regions, such as regions 24 of FIG. 1, which are blocked by, or which lie under (or over) the conductors.

As a consequence of the curvature of the electric field near the edges of each segment of the liquid crystal array, which affects the phase shifting performance of the segment, and also because of the opacity of the low resistivity electrical conductor associated with an edge of each liquid crystal segment, effective light transmission with suitable phase-shifting performance can only be achieved near the center of each liquid-crystal segment. This center region may be termed the "active" region of the segment, and regions in which light is blocked, or in which phase control is imperfect, may be termed "inactive".

FIG. 2 illustrates liquid crystal array 10 of FIG. 1, associated with a planar aperture mask designated generally as 30, closely spaced therefrom in the y direction. As seen in cross-section in FIG. 2, aperture mask 30 includes periodically spaced opaque portions 32a, 32b, 32c ..., together with periodically spaced apertures or transparent portions 34a, 34b, 34c .... The spacing period of opaque portions 32 and apertures 34 is P. As illustrated in FIG. 2, opaque portions 32 of aperture mask 30 are dimensioned to prevent light 13 from falling upon edge portions of the segments of liquid crystal array 10; the opaque portion has a width of about P/2. As suggested by light-representative photon symbol 13a, light falling upon aperture 34d can pass therethrough and progress toward the central portion of the liquid crystal array segment associated with transparent conductor 16d, while light represented by photon symbol 13b, which would otherwise pass through liquid crystal array 10 near the edges of the liquid crystal array segments associated with transparent conductors 16c and 16d, is instead blocked (either absorbed or reflected) by opaque portion 32d of aperture mask 30. While aperture mask 30 improves the phase modulation performance of the liquid crystal array by constraining light to pass through the active region, it also reduces the transmissivity of the combination by blocking a portion of the light.

FIG. 3a is a representation of the light amplitude or irradiance, plotted against x position, at a location immediately adjacent the exit side of aperture mask 30 of FIG. 2, i.e. at the location of liquid crystal array 10. The light amplitude is indicated by plot 36 as being a maximum, or "1", at locations corresponding to apertures 34 of aperture mask 30, and a minimum, or "0", at locations shadowed by opaque portions 32 of the mask. FIG. 3b illustrates by discontinuous plot 38 the relative phase of the light emanating from the apertures. As illustrated, all the light is at the same relative phase. The phase plot does not provide phase information in regions in which the amplitude is zero.

Figure 4B:
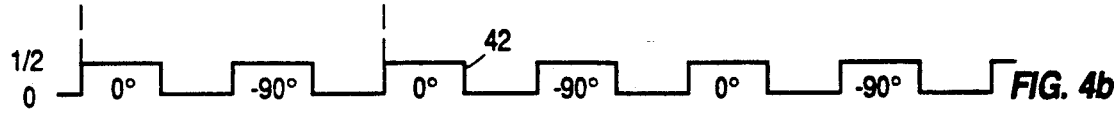

FIG. 4a illustrates for reference an idealized plot 40 of light amplitude versus position x immediately adjacent the exit side of an aperture mask similar to mask 30 of FIG. 2, in the absence of any other structure, for 25% fill factor illumination, where fill factor is the quotient (substantially reinforced area)/(substantially canceled area). Plot 40 is similar to plot 36 of FIG. 3a, and includes markings indicating the relative phase of the irradiance peaks, corresponding to plot 38 of FIG. 3b. Plot 40 shows irradiance peaks with a period P. FIG. 4b illustrates as a plot 42 the irradiance of the same aperture mask, but at a distance of three-fourths the Talbot distance $Z_T$ (3 $Z_T$/4) from the center of the aperture mask. The Talbot distance $Z_T$ is given by $$Z_T 2P^2/\lambda \qquad (1)$$

Plot 42 shows that, as a result of the effects of constructive and destructive interference, irradiance peaks occur with twice the period P. Since the energy of a single irradiance peak of plot 40 is distributed between two peaks in plot 42, the peak irradiance is ½ rather than 1. As indicated by the phase designations, the phase of the irradiance peaks of plot 42 alternate between 0° and −90°.

Figure 4C:
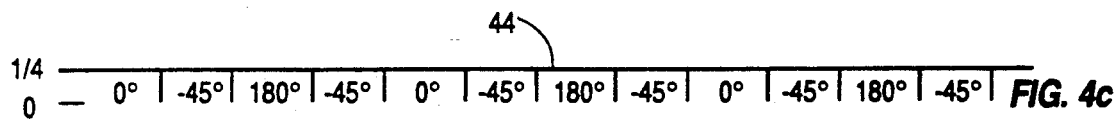

FIG. 4c illustrates as a plot 44 the energy r distribution at a distance of $7Z_T$/8 from aperture mask 30 of FIG. 2. The irradiance nulls are completely filled in, and a constant irradiance results. The relative amplitude of the constant irradiance is ¼, since the energy originally distributed over ¼ of the wavefront in plot 40 of FIG. 4a is now distributed over the entire wavefront. In addition, the phase has progressed so that the progression of relative phase is a repeating cycle of 0°, −45°, 180°, −45°, 0°, −45°, 180°, . . . .at locations corresponding to the irradiance peaks which filled in the wavefront.

Figure 4D:

FIG. 4d illustrates as a plot 46 the irradiance at the Talbot distance $Z_T$ from the aperture mask of FIG. 2. As a result of interference, irradiance peaks again appear, spaced with period P, and with 0° relative phase. It should be noted that plot 46 of FIG. 4d is identical to plot 40 of FIG. 4a, and represents the same amplitude and phase distribution.

Figure 4E:
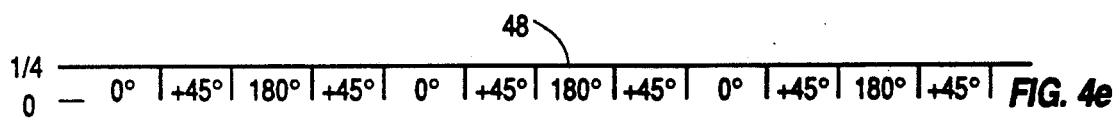
Figure 4F:
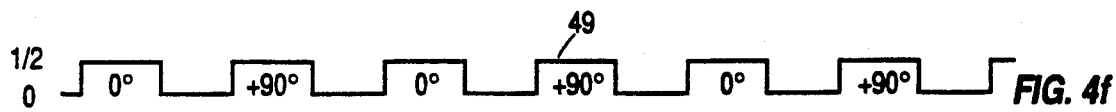

Plot 48 of FIG. 4e represents the constant-amplitude irradiance (amplitude ¼) occurring at a distance equal to 9 $Z_T$/8 from the aperture mask of FIG. 2, and the phase, which assumes a repeating pattern 0°, +45°, 180°, +45°, 0°, +45°, 180° . . . Plot 49 of FIG. 4f represents the irradiance at a distance of $5Z_T$/4. The peak irradiance has a relative amplitude of ½, and the phase alternates between 0° and +90° from one peak to the next.

In accordance with an aspect of the invention, a Fresnel image phase plate or Talbot plane phase plate is used instead of an aperture mask. FIG. 5 is a cross-section of a Talbot plane phase plate 50. As illustrated, phase plate 50 is a transparent plate having an index of refraction, such as fused silica, glass or quartz, in which a plurality of periodically spaced depressed portions (rulings or grooves) 52 are formed below adjacent raised portions (lands) 54. Grooves 52 have a physical depth selected to have a relative optical path length L equal to one-quarter wavelength ($\lambda$/4) or 90° at the frequency of light 13, where $$L=(n_{fs}-n_1)D \qquad (2)$$

and $n_{fs}$ is the index of refraction of the fused silica or other substrate material, $n_a$ is the index of refraction of air, and D is the physical depth of a groove.

Grooves 52 are elongated, with the long dimension extending perpendicular to the plane of the FIGURE, i.e. parallel to the z axis. Grooves 52 and intervening lands 54 are spaced with period P. In the particular embodiment of FIG. 5, the lands and grooves are of equal width, each having an x-dimension corresponding to one-half period or P/2. Plate 50 is illustrated as being little thicker in the y dimension than the groove depth, but its actual thickness is many wavelengths. The effect of the $\lambda$/4 grooves on light 13 traversing phase plate 50 is to generate an interference pattern which results in a redistribution of light energy.

Phase plate 50 imposes a periodic phase profile upon the propagating electromagnetic wavefront, as a result of the periodic structure of the regions of the plate. The phase shift, in radians, of each region is $$2\pi Tn/\lambda \qquad (3)$$

where

T is the thickness of the material;

n is the index of refraction; and $\lambda$ is the wavelength of light.

The phase shift introduces a region-to-region relative phase shift as a result of thickness variations of the lands relative to the grooves. A phase plate could achieve similar performance by a profile including regions of equal thickness T but of different indices of refraction.

Figure 4G:
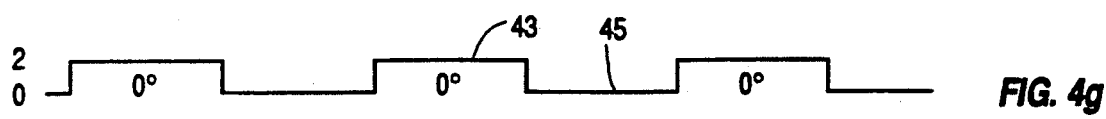
FIG. 4g shows the pattern for 50% fill factor.

Directly beneath a land area 54 of Talbot plane phase plate 50 of FIG. 5, the light exiting from phase plate 50 is delayed by 90° relative to the light passing through groove 52, as a result of the additional λ/4 path length in the dielectric medium. The phase profile of the light exiting from phase plate 50 of FIG. 5 is similar to that of FIG. 4b, but light transmission occurs at all locations. In effect, a plot of the light transmission immediately adjacent phase plate 50 of FIG. 5 is the equivalent of two plots such as plot 42 of FIG. 4b, mutually shifted by P/4. Plot 43 of FIG. 4g represents the spatial energy distribution at a distance of $Z_T/4$ from phase plate 50 of FIG. 5, and is equivalent to plot 46 of FIG. 4d, replicated with an offset of P/4. Note that the relative amplitude of the irradiance peaks of plot 43 is 2, because no part of the incident light energy is blocked, but all the energy is instead concentrated in the regions of the maxima.

Figure 6:
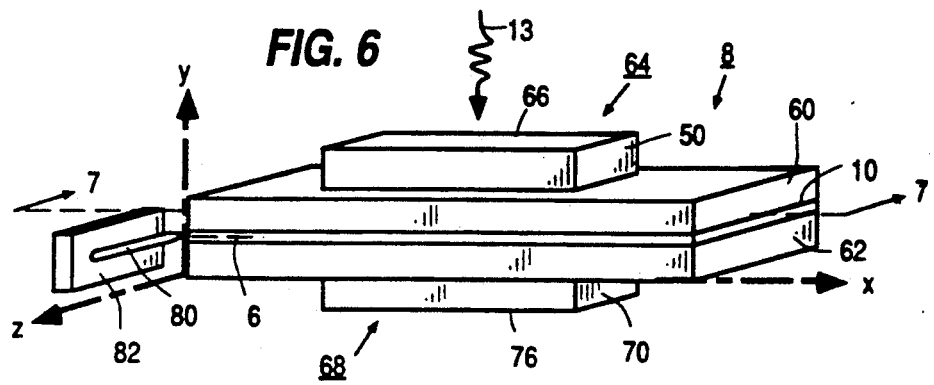
FIG. 6 is a perspective or isometric view of an optical beam scanning arrangement, using a liquid crystal array such as that of FIG. 1, together with an aperture illuminator and a beam filler, each of which is similar to the phase plate of FIG. 5, all in accordance with the invention.

FIG. 6 illustrates an electromagnetic beam scanning arrangement according to the invention. In FIG. 6, a beam scanning arrangement 8 includes an array 10 of liquid crystal phase shifting elements similar to array 10 of FIG. 2, sandwiched between a pair of glass spacer plates 60 and 62. According to an aspect of the invention, a transparent aperture illuminator 64 is mounted upon glass plate 60. Illuminator 64 includes a Fresnel image phase plate or Talbot plane phase plate 50 similar to that of FIG. 5. The rulings (not illustrated in FIG. 6) of phase plate 50 are formed on its upper surface 66.

A beam filling arrangement 68 includes a similar transparent Talbot plane phase plate 70 which is affixed to the underside (not visible in FIG. 1) of glass plate 62, and which has its rulings on its lower surface 76. The rulings of phase plate 68 are ordinarily in registry with the rulings of phase plate 64. A control bus 80 carries electrical control signals from a controller 82 to the various phase shifter elements of liquid crystal array 10, for applying a voltage thereto which controls the phase shift of each liquid crystal phase shifter element, in known fashion. Coordinate axes x, y and −z are illustrated for reference.

When a beam of collimated light, illustrated in FIG. 6 by a photon symbol 13, impinges upon beam scanning arrangement 8, it passes through the rulings of aperture illuminator 64, and is modified by mutual interference into a pattern of alternating maxima and minima similar to that illustrated by plot 43 of FIG. 4g. The locations of the maxima are selected to illuminate the active regions of the liquid crystal array, as described below. This in itself improves the transmission efficiency through the array of phase shifters by comparison with transmission through the array of phase shifters alone, or the array of phase shifters associated with an apertured amplitude mask. However, the aperture illuminator phase plate forms the light into separate, mutually distinct beams or packets, which in the far field form undesired grating lobes. In accordance with another aspect of the invention, the far-field grating lobes generated by the aperture illuminator are reduced by beam filler 68, as described below.

Figure 7:
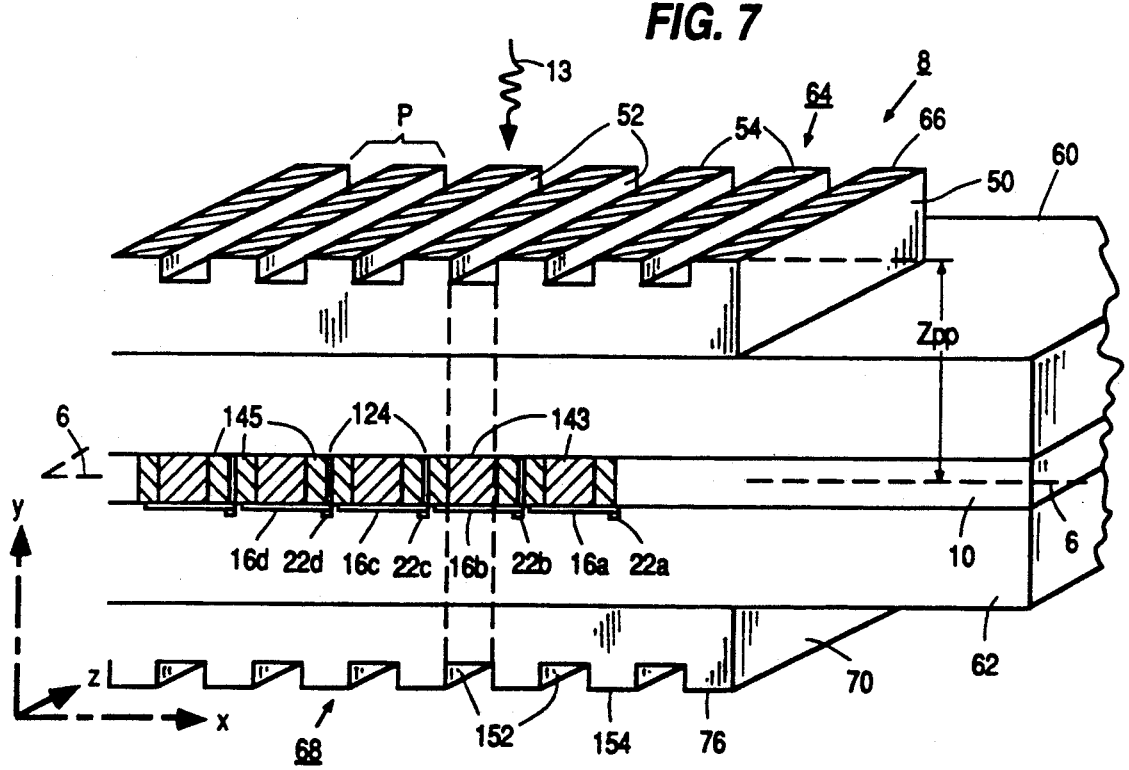
FIG. 7 is a cross-sectional view of the structure of FIG. 6 taken along section lines 7—7 of FIG. 6.

Elements of FIG. 7 corresponding to those of FIG. 6 are designated by the same reference numerals. In FIG. 7 the elongation of periodic grooves or rulings 52 in the Z direction is readily visible. The optical depth of grooves 52 below lands 54 is one-quarter wavelength (λ/4) within the transparent material at the frequency of the light of beam 13. As mentioned, rulings or grooves 52 have a rectangular cross-section as seen in the x-y plane, and have a width in the x direction equal to half the distance between grooves. A period P is the length or distance occupied by the combination of one land and one groove, conventionally measured between any mutually adjacent corresponding portions of the structure.

Plane 6 of FIG. 6 is parallel to the x-z plane and passes through the nominal center of array 10 of phase shifters. While it is at or near the center of optical symmetry, it is not, strictly speaking, a plane of symmetry, because the electrical conductors are not symmetrically disposed in relation thereto.

In FIG. 7, the edges of optically opaque electrical conductors 22a, 22b, 22c . . . are visible, regularly spaced with period P along array 12 of liquid crystal elements. As mentioned, the liquid crystal elements defined by the associated electrical conductors 16a, 16b, 16c . . . and 22a, 22b, 22c . . . are elongated in the z direction parallel to rulings 52, although the elongation of the electrical conductors is not visible in FIG. 7. Regions 124 represent regions of liquid crystal array 10 which are overlain by conductors 22 and are therefore not effective for transmission of light because of the opacity of the conductor material, and are therefore "inactive" for the purpose of transmitting phase-shifted radiation or light. The inactive regions of liquid crystal array 10 also include regions near regions 124, in which the actual shadowing does not occur, but in which electric field lines are not orthogonal to the x-z plane, so that the phase shifting performance is not easily predicted.

According to an aspect of the invention, the distance between lands 54 of phase plate 50 and center plane 6 of phase shifter array 10 is selected to cause periodic energy maxima and minima to be produced by the phase plate as illustrated in FIG. 4g, with the minima regularly spaced and located so as to match the spacing and locations of the above-mentioned inactive regions of the liquid crystal array. The separation or distance $Z_{PP}$ between phase plate 64 and phase shifter array 10 is optimally selected to be a fractional portion 1/N, where N is an integer, of the Talbot distance $Z_T$ defined by equation (1). In the arrangement of FIGS. 5 and 7, both lands and grooves 52 of array 10 are regularly spaced with period P, and the spacing is given by $$Z_{pp} = (1/N)Z_T \quad (4)$$

The fractional portion of the Talbot distance is determined by integer N, which is related to the relative widths of the lands and grooves $$N = 2P/W_L$$

where $W_L$ is the width of a land 54 in the x direction.

When the widths of lands 54 and grooves 52 are each P/2 as described in conjunction with FIGS. 5 and 7, $$N = P/(W_L/2)$$

whereby N in equation (4) is established as 4. Thus, for equal widths of lands and grooves, from equation (4)

$$Z_{pp} = \tfrac{1}{4} Z_T$$

which means that the optical distance from the lands 54 of the phase plate to the center of the liquid crystal phase shifter array is $$Z_{pp} = \frac{1}{4} Z_T$$

-continued $$Z_{pp} = \left(\frac{1}{4}\right)\frac{2P^2}{\lambda}$$

$$Z_{pp} = \frac{P^2}{2\lambda}$$

at which distance energy minima occur in the illumination produced by phase plate 64, with a period P which matches the period of the inactive portions of liquid crystal array 10. Since the wavefront propagates in glass from the grooves in the phase plate to the active regions in the liquid crystal array, the physical distance between the grooves in the phase plate to the active regions in the liquid crystal array is established as the product of the index of refraction of glass (n) multiplied by $Z_{pp}$. Phase plate 64 is registered with liquid crystal array 10 in the manner illustrated in FIG. 7, so that energy minima, represented by singly hatched regions 145, extend across at least portions, and ideally all, of the inactive regions (both shadowed and nonorthogonal field portions) of the liquid crystal array. Under this condition, the energy maxima "funnel" all the light (except for the transmission loss of the glass) through the active portions of the liquid crystal array, as suggested by crosshatched regions 143 of FIG. 7.

For operation at $\lambda=0.83$ μm, a period P of 47 μm may be used, the lands are raised approximately 0.4 microns above the grooves in a fused silica plate (index of refraction approximately 1.5) whereupon the separation $Z_{pp}$ between the lands of the phase plate and the center of the liquid crystal array is about 1.33 mm in air, which is 2.00 mm of glass.

The light passing through phase shifter array 10 of FIGS. 6 and 7 is phase-controlled in known manner by control voltages applied over bus 80 from control unit 82, and the light emerges from the lower side of the phase shifter array. One of the advantages of the described invention is that the "depth of field" of the illumination pattern produced by phase plate 64 is relatively great, so that the described maxima and minima tend to be maintained over a relatively large "focal distance" by comparison with a microlens array. This has the advantage that a plurality of phase shifter arrays may be cascaded in the light path without excessive loss, and also has the advantage of maintaining a relatively flat field (relatively low electromagnetic field phase curvature) over a relatively long distance in the direction of propagation. The large depth of focus causes the light emerging from phase shifter array 10 to emerge in distinct regions, spaced apart by P, and individually phase controlled. Since P is large compared with a wavelength, the light emerging from phase shifter array is, in effect, emerging from an array of apertures mutually spaced apart by a distance greater than $\lambda$. Such an array creates a far-field pattern which includes undesirable grating lobes.

According to an aspect of the invention, a second phase plate 68 is arranged and spaced to perform beam filling, thereby reducing or eliminating the grating lobes.

Referring once again to FIGS. 6 and 7, beam filling arrangement 68 includes a second Fresnel image phase plate or Talbot plane phase plate 68, at least similar to phase plate 64. Best results are obtained if phase plate 68 is identical to phase plate 64. As illustrated in FIG. 7, the lands 154 and grooves 152 of beam filling phase plate 68 have periods P and relative widths equal to those of lands 54 and grooves 52 of phase plate 64. Lands 154 and grooves 152 of phase plate 68 are registered with the lands 54 and grooves 52, respectively, of phase plate 64. Beam filling phase plate 68 has its lands 154 spaced at the same distance from center plane 6 as the lands 54 of aperture illuminator phase plate 64.

Beam filling phase plate 68 reverses the decomposition of incident light beam 13 into spaced-apart packets 143, by recombining the light packets into a single uniform beam. It should be noted that best performance in the reduction of grating lobes occurs when the beam scan angle is small, but that an improvement (reduction in amplitude) of the grating lobes occurs over a larger scan angle.

More generally, it may be desired to specify the array of the illuminator phase plate such as 64 of FIGS. 6 and 7, to achieve a particular amount of fill, to thereby spread the light over the full active region of each liquid crystal element of the liquid crystal array. With a fill of 100/N percent, where N is selected to be equal to 2 raised to an integer power, the phase $\phi_k$ of the kth region is $$\phi_k = \pi k^2/N.$$

To minimize the phase plate pattern thickness, the modulo $2\pi$ nature of the phase is typically used when the phase of the $k^{th}$ element is formed. Using the distance convention described in conjunction with FIG. 4, such an illuminator phase plate is located at a distance $Z_{pp}$ from the liquid crystal array, where $$Z_{pp} = (-(0.5/N))Z_T \qquad (5)$$

where $Z_T$ is the Talbot distance.
At a position of $$Z_{pp}(+(0.5/N))Z_T$$

which is on the other side of the liquid crystal array from the beam illuminator, the phase pattern of the propagated wavefront will be $$\phi_k = -\pi k^2/N \qquad (6)$$

but the phase pattern of the beam filling phase plate pattern should be its conjugate, so that the beam filling phase plate pattern becomes $$\overline{\phi_k} = \pi k^2/N$$

The phase patterns for Talbot plane phase 25 plates associated with the quotient 100/Q, where Q is not equal to 2 raised to an integer power, can be found by analyzing the Fresnel images created by the desired array illumination pattern.

Best results under most conditions occur when identical phase plates are used for both the array illuminator and the beam filler, although grating lobes may be reduced even if non-identical phase plates are used.

Figure 8A:
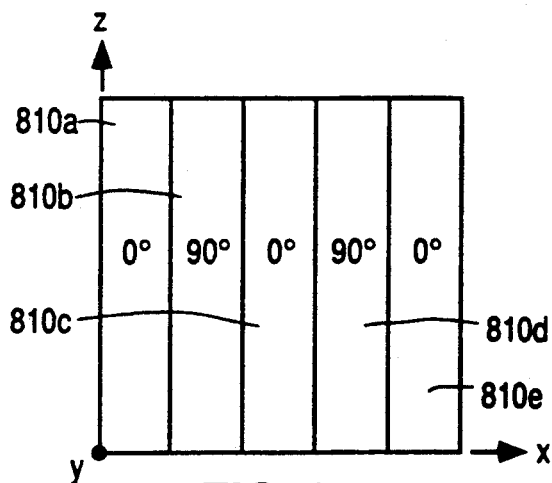
FIG. 8a illustrates in plan view a phase plate arrayed in the x direction.
Figure 8B:
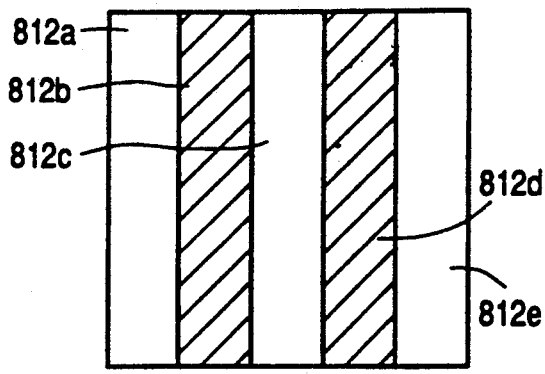
FIG. 8b represents the illumination pattern at a distance of $Z_T/4$ therefrom.
Figure 8C:
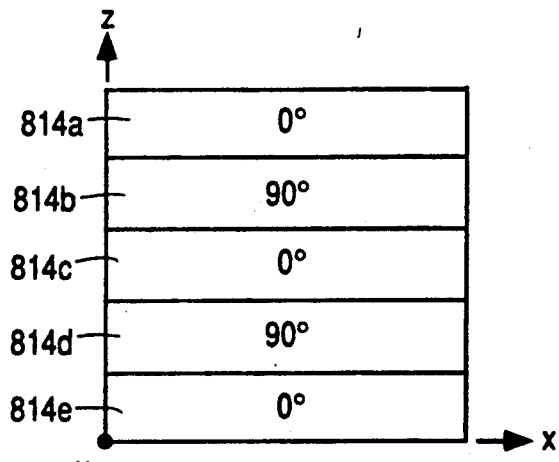
FIG. 8c illustrates a phase plate arrayed in the y direction.
Figure 8D:
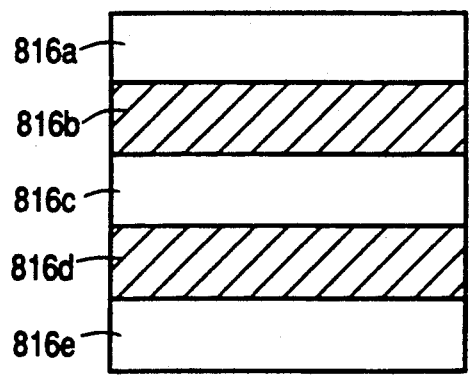
FIG. 8d illustrates the illumination pattern at a distance of $Z_T/4$ therefrom.

FIG. 8a illustrates a plan view of a phase plate, which may be similar to phase plate 64 of FIG. 6, viewed along the y axis. The array elements are arrayed in the x direction, and are elongated in the z direction. The phase imparted by each element is designated in FIG. 8a, with elements 810a, c, and e providing 0° or reference phase, and elements 810b and d providing relative 90° phase shift, corresponding to a phase delay. Thus, elements 810a, c and e may be considered to be regions incorporating a relatively lower index of refraction, such as a groove region 52 of FIG. 7, while regions 810b and d may be considered to be regions incorporating a relatively higher index of refraction, such as land regions 54 of FIG. 7. The plane of the land regions of the array of FIG. 8a may be considered to be a reference plane. FIG. 8b represents the illumination amplitude or irradiance at a distance of $Z_T/4$ from the reference plane of FIG. 8a, and thus the illumination function of FIG. 8b is the illumination function of a liquid crystal array placed at $Z_{pp}=Z_T/4$ from the reference plane of FIG. 8a. Canceled regions are represented by hatching, and reinforced illumination regions are represented without hatching. As illustrated, the illumination pattern is elongated in the z direction to match elongated liquid crystal elements such as those described in conjunction with FIG. 7. FIG. 8c represents a phase plate array similar to that of FIG. 8a, in which the elements are arrayed in the z direction, and the pattern of FIG. 8d represents the illumination function at a distance $Z_{pp}=Z_T/4$ from the reference plane of FIG. 8c.

Figure 8E:
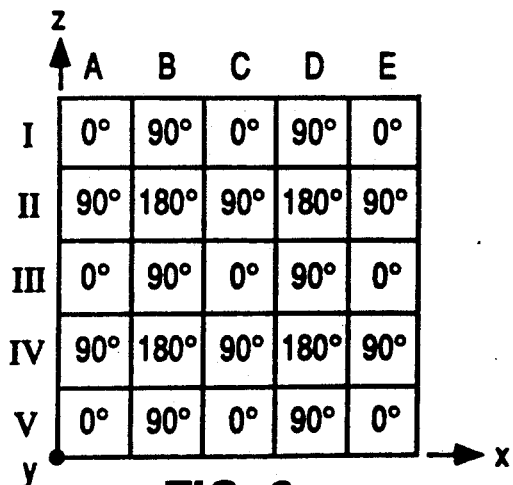
FIG. 8e illustrates a phase plate arrayed in both the x and y directions.
Figure 8F:
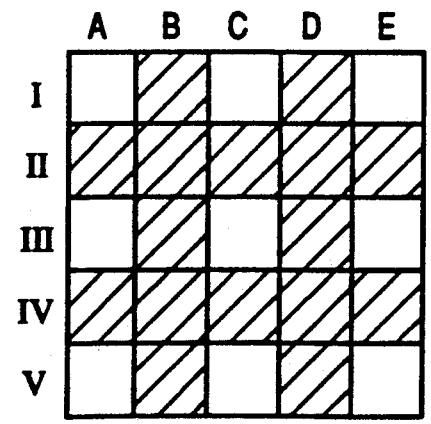
FIG. 8f illustrates the illumination pattern produced thereby.

FIG. 8e represents a phase plate arrayed in both the x and z directions. The phase plate of FIG. 8e is in effect the superposition of the phase plates of FIGS. 8a and 8c, with the result that the elements of the phase plate of FIG. 8e are rectangular. In FIG. 8e, elements are arrayed in the x direction in columns designated A, B, C, D and E, and in the z direction in rows designated I, II, III, IV and V. Each element may be identified by its row and column address. The phase shift imparted by each element is indicated in FIG. 8e. Element AI of FIG. 8e has a phase contribution of 0° (reference phase), as may be surmised by an imaginary overlay of FIGS. 8a and 8c; the intersection of elements 810a (0° phase) and 814a (0° phase) yields a sum phase contribution of 0°. The imaginary overlay of FIG. 8c on FIG. 9a shows that the intersection of elements 810b and 814a associates a 0° element with a 90° element, for a sum of 90°; corresponding element BI of FIG. 8e thus has a phase contribution of 90°. In a similar manner, element AII of FIG. 8e has a phase contribution of 90°, as may be divined by considering that its location corresponds to the intersection of element 814b of FIG. 8c (90°) with element 810a of FIG. 8a (0°). Element BII of FIG. 8e corresponds to the intersection of elements 810b (90°) and 814b (90°), and thus has a phase contribution of 180°. The phase contributions of other elements of the phase plate of FIG. 8e are determined in a like manner. FIG. 8f represents the illumination at a distance $Z_{pp}=Z_T/4$ from the phase plate of FIG. 8e. The illuminated (unhatched) and dark (hatched) regions are formed into an array of rows and columns designated I through V and A through E, respectively. Such a pattern of illumination is suitable for illuminating a two-dimensional array of phase shifting elements such as a two-dimensional liquid crystal phase shifting array (not illustrated in FIG. 8). Such a two-dimensioned phase plate array illuminating a two-dimensional liquid crystal array allows beam steering to take place in two dimensions by adjustment of the phase shifts of the various elements of the phase shifter array, without the need for cascading two arrays of elongated elements.

Figure 8G:
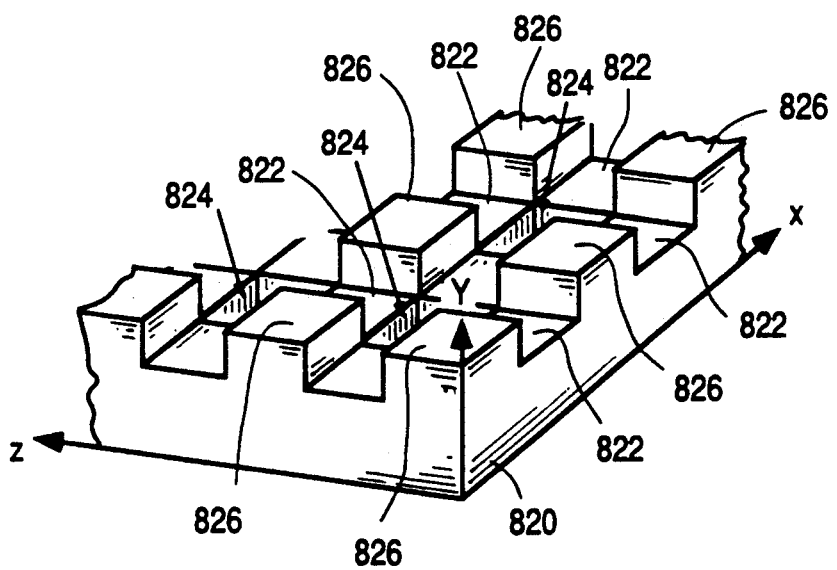
FIG. 8g illustrates in perspective or isometric view a portion of a tri-level phase plate corresponding to an embodiment of FIG. 8e.

FIG. 8g is a perspective or isometric view of a transparent structure 820, the upper surface of which includes a tri-level array in the x and z directions of land areas 822, corresponding to the 90° phase shift regions of the structure of FIG. 8e, depressed areas 824, corresponding to the 0° region of FIG. 8e, and raised regions 826, corresponding to the 180° portions of FIG. 8e.

In another embodiment of the invention, the structure of FIG. 6 is optically divided into two parts along plane 6, and a light reflecting surface is substituted for plane 6. Naturally, the electrical connectors to the liquid crystal array must be maintained intact. In this additional embodiment, light traverses a first transmissive phase plate such as 64 of FIG. 6, and traverses the liquid crystal phase shifter, thereafter being reflected for a second traversal of the liquid crystal phase shifter and the phase plate. As is known in the art, such a scheme reduces the amount of phase shift which must be imparted to the light by the phase shifter array in order to achieve a particular amount of scanning.

Other embodiments of the invention will be apparent to those skilled in the art. For example, while the rulings of the aperture illuminator phase plate and the beam filter phase plate are ordinarily maintained in registry, an on-axis null can be obtained by a mutual offset with a magnitude of one-half period (P/2).

What is claimed is:

1. A beam controller for a beam of light from a light source, said light defining a wavelength λ, comprising:
   a plurality of controllable phase shifting elements arrayed in a first array direction to produce an array of phase shifting elements, each of said phase shifting elements defining an active region capable of controllable propagation of light, and also defining a further region in which said controllable light transmission is impaired, said elements of said array occupying periodic locations along said array with a period dimension P, with said active and further regions alternating along said array, each with said period P, said array of phase shifting elements being oriented relative to said source of light so that at least a portion of said light traverses at least some of said active areas to form an array of controlled beams of light;
   a phase plate located between said source of light and said array of phase shifting elements for being traversed by said beam, said phase plate comprising a plate of transparent material defining a repeating pattern, in a second array direction parallel with said first array direction, said repeating pattern in said second array direction including portions of higher and lower index of refractions, a dimension of each of said portions of higher and lower index of refraction in said second array direction being equal to or exceeding said wavelength λ, said phase plate being spaced from said array of phase shifting elements by a distance less than a quotient of a product divided by said wavelength λ, where said product is equal to twice the square of said period P, for generating from said beam of light a spatial pattern of light maxima in said active regions of said array of phase shifting element, and of light minima near said further regions; and
   light reflective means located adjacent said array of phase shifting elements for causing said array of controlled beams of light to be reflected after traversal of said array of phase shifting elements to thereby effect a second traversal of said array of phase shifting elements and said phase plate.

2. A beam controller according to claim 1, in which said controllable phase shifting elements comprise nematic material.

3. A beam controller according to claim 1, wherein: each of said controllable phase shifting elements is elongated in a direction orthogonal to the arraying direction, and wherein said portions of higher and lower index of refraction are elongated in said direction orthogonal to said direction of said array.

4. A beam controller according to claim 1 wherein said repeating pattern of portions of higher and lower index of refraction comprises a surface ruled with a repeating pattern of stepped physically raised and lower portions, in which said raised portions correspond to said portions of higher index of refraction, and said lower portions correspond to said portions of lower index of refraction.

5. A beam controller for a beam of light from a light source, said light defining a wavelength $\lambda$, comprising:
a plurality of controllable phase shifting elements arrayed in a first array direction to produce an array of phase shifting elements defining first and second sides, each of said phase shifting elements defining an active region capable of controllable propagation of light, and also defining a further region in which said controllable light transmission is impaired, said elements of said array occupying periodic locations along said array with a period dimensions P, with said active and further regions alternating along said array, each with said period P, said array of phase shifting elements being oriented with said first side of said array facing said source of light so that at least a portion of said light traverses at least some of said active areas to form an array of controlled beams of light on said second side of said array of phase shifting elements;
a first phase plate located between said source of light and said first side of said array of phase shifting elements for being traversed by said beam, said first phase plate comprising a plate of transparent material defining a repeating pattern, in a second array direction parallel with said first array direction, said repeating pattern in said second array direction including portions of higher and lower index of refraction, a dimension of each of said portions of higher and lower index of refraction in said second array direction being equal to or exceeding said wavelength $\lambda$, said first phase plate being spaced from said array of phase shifting elements by a distance less than a quotient of a product divided by said wavelength $\lambda$, where said product is equal to twice the square of said period P, for generating from said beam of light a spatial pattern of light maxima in said active regions of said array of phase shifting elements, and of light minima near said further regions; and
a second phase plate comprising a second plate of transparent material defining a repeating pattern of portions of higher and lower index of refraction, similar to those of said first phase plate, said second phase plate being located adjacent to said second side of said array of phase shifting elements in said controlled beams of light, and spaced therefrom by a distance less than said quotient of said product divided by said wavelength $\lambda$, for thereby filling the beam exiting from said array of phase shifting elements to reduce grating lobes.

6. A beam controller according to claim 5, wherein said repeating pattern of portions of higher and lower index of refraction of at least one of said first and second phase plates comprises a surface ruled with a repeating pattern of stepped, physically raided and lower portions.

7. A beam controller according to claim 5, in which said controllable phase shifting elements comprise nematic material.

8. A beam controller according to claim 5, wherein: each of said controllable phase shifting elements is elongated in a direction orthogonal to the arraying direction, and wherein said portions of higher and lower index of refraction are elongated in said direction orthogonal to said direction of said array.

9. An electromagnetic arrangement for a beam of radiation comprising light have a wavelength $\lambda$, comprising:
a planar array of phase controllable phase shifting means, each of said phase shifting means including an edge region, a spacing of said phase shifting means of said array defining an array period P; and
aperture illumination means, said aperture illumination means including a first plate transparent to said electromagnetic radiation, a surface of said first plate being ruled with a pattern of lands and grooves alternating with a period P, the maximum height of said lands over said grooves being a distance selected to impart a phase shift of about 90° to electromagnetic radiation traversing said lands, said lands of said first plate being located adjacent a first side of said planar array, and spaced from a plane passing through a center of said planar array of phase shifting means by a distance which is less than $2P^2/\lambda$, said lands and grooves of said first plate being registered with said array of phase shifting means in such a manner as to tend to minimize transmission of said radiation through said edge regions of said phase shifting means while tending to maximize transmission of said radiation through said array of phase shifting elements;
beam filling means, said beam filling means including a second plate transparent to said electromagnetic radiation, a surface of said second plate being ruled with a pattern of lands and grooves alternating with said period P, the maximum height of said lands over said grooves being said distance selected to impart a phase shift of about 90° to electromagnetic radiation traversing said lands, said lands of said second plate being located adjacent to a second side of said planar array, and spaced from said plane passing through said center of said array of phase shifting means by said distance which is less than $2P^2/\lambda$, said lands and grooves of said second plate being registered with said array of phase shifting means in such a manner as to reduce the magnitude of grating lobes.

10. An arrangement according to claim 9, wherein said array of phase shifting means comprises a liquid crystal phase shifter array for phase shifting light.

* * * * *